United States Patent [19]

Kim et al.

[11] Patent Number: 5,120,407
[45] Date of Patent: Jun. 9, 1992

[54] ELECTROCHEMICAL POLYMERIZATION OF FIVE-MEMBERED HETEROCYCLIC MONOMERS

[75] Inventors: Chung Y. Kim; Hee-Woo Rhee; Kyung S. Min, all of Seoul, Rep. of Korea

[73] Assignee: Korea Institute of Science and Technology, Seoul, Rep. of Korea

[21] Appl. No.: 565,799

[22] Filed: Aug. 13, 1990

[30] Foreign Application Priority Data

Feb. 17, 1990 [KR] Rep. of Korea ............ 1964/1990[U]

[51] Int. Cl.⁵ .................................................. C25B 3/00
[52] U.S. Cl. ................................................. 204/59 R
[58] Field of Search .................................... 204/59 R

[56] References Cited

U.S. PATENT DOCUMENTS

| | | | |
|---|---|---|---|
| 3,574,072 | 4/1971 | Louvar | 204/72 |
| 4,487,667 | 12/1984 | Traynor | 204/59 R |
| 4,585,695 | 4/1986 | Ogasawara et al. | 428/364 |

Primary Examiner—John Niebling
Assistant Examiner—Steven P. Marquis
Attorney, Agent, or Firm—Leydig, Voit & Mayer

[57] ABSTRACT

There is provided a process for preparing five-membered heterocyclic polymers represented by a formula (II) which comprises electrochemically polymerizing five-membered heterocyclic monomers of formula (I) in the presence of tetrabutylammonium alkylsulfate as an electrolyte and an organic solvent, wherein formulas (I) and (II) are represented by the formulas

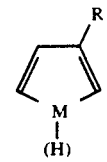

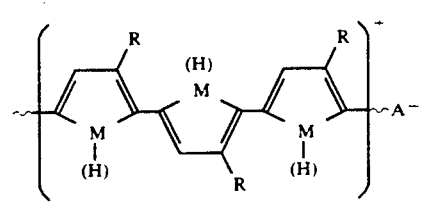

and wherein, M represents nitrogen or sulfur, provided that hydrogen is deleted when M is sulfur;

R is hydrogen or a $C_4$–$C_{22}$ aliphatic alkyl group, provided that R is hydrogen when M is nitrogen, while R is hydrogen or a $C_4$–$C_{22}$ aliphatic alkyl group including butyl, pentyl, hexyl, octyl and dodecyl when M is sulfur; and A represents an anion formed from an electrolyte dissociated in the electrolytic polymerization cell and functions as a dopant which facilitates electric conductivity to the polymer.

5 Claims, 2 Drawing Sheets

ELECTROCHEMICAL POLYMERIZATION OF FIVE-MEMBERED HETEROCYCLIC MONOMERS

TECHNICAL FIELD

The present invention relates to a process for preparing five-membered heterocyclic polymers represented by a formula (II) which comprises electrochemically polymerizing five-membered heterocyclic monomers represented by a formula (I) in the presence of tetrabutylammonium alkylsulfate as an electrolyte and an organic solvent.

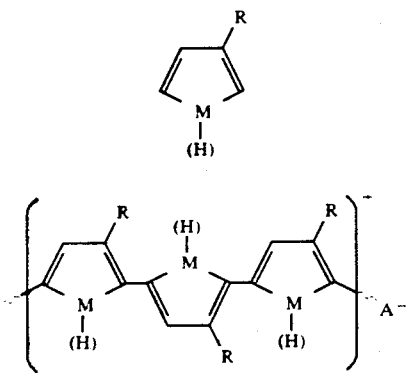

In the formula (I),
- M represents nitrogen or sulfur, provided that hydrogen is deleted when M is sulfur;
- R is hydrogen or a $C_4$–$C_{22}$ aliphatic alkyl group, provided that R is hydrogen when M is nitrogen, while R is hydrogen or a $C_4$–$C_{22}$ aliphatic alkyl group including butyl, pentyl, hexyl, octyl and dodecyl when M is sulfur.

In the formula (II),
- M represents nitrogen or sulfur, provided that hydrogen is deleted when M is sulfur;
- R is hydrogen or a $C_4$–$C_{22}$ aliphatic alkyl group, provided that R is hydrogen when M is nitrogen, while R is hydrogen or a $C_4$–$C_{22}$ aliphatic alkyl group including butyl, pentyl, hexyl, octyl and dodecyl when M is sulfur; and
- A represents an anion formed from an electrolyte dissociated in the electrolytic polymerization cell and functions as a dopant which facilitates electric conductivity to the polymer.

High electroconductive polymers according to the present invention are expected to be used in semiconductor elements and solar cells. Five-membered heterocyclic monomers according to the present invention include pyrrole, thiophene and thiophene derivatives, i.e. 3-octylthiophene. Five-membered heterocyclic polymers extend to polypyrrole, polythiophene and poly(3-octylthiophene).

BACKGROUND OF THE INVENTION

Investigations have been conducted on five-membered heterocyclic polymers which have high stability in atmosphere and high electric conductivity. For example, U.S. Pat. No. 3,574,072 discloses polymerization of five-membered electroconductive polymers by electro-oxidation in a polar organic solvent containing water (water content: below 25%). However, favorable films are not obtained in an organic solvent containing no water.

In addition, a literature reference (Mol. Cryst. Liq. Cryst., 83, 1297, 1983) discloses a process for preparing thick films, of which electric conductivity is 0.01 to 100 S/cm, in an organic solvent with various anions such as tetrafluoroborate, hexafluorophosphate, perchlorate, hydrogen sulfate, fluorosulfonate, p-toluenesulfonate and trifluoroacetate. This process has disadvantages in that physical properties of electroconductive polymers are greatly influenced by anions, which eventually render difficulties in utilizing them because of brittleness (elongation: 2 to 3%).

Consequently, a process to synthesize electroconductive polymers in aqueous solution with a polymeric electrolyte (J. Chem. Soc., Chem. Commun., P. 327, 1987) or sodium alkyl sulfate ($C_nH_{2n+1}OSO_3Na$, wherein n is an integer of 4 to 16) as an electrolyte has been attempted to solve such a problem. However, the polymeric anion remarkably increases elongation up to 400%) of the electroconductive polymer, providing a flexible film, while it reduces electric conductivity to $10^{-3}$ S/cm. Otherwise, a sulfate ion having a long alkyl group as a dopant provides a good film of excellent physical properties as well as electric conductivity ranging from 5 to 160 S/cm.

A literature reference (Synth. Met., 20, p. 119, 1987) states that electro-polymerization in an aqueous solution causes an irreversible reaction between strong nucleophilic water and a cationized electroconductive polymer and gives the polymer poor electrochemical reversibility caused by electrochemically inactive ketone and hydroxy groups formed in the main chain of the polymer.

SUMMARY OF THE INVENTION

The present inventors have continuously conducted studies to solve the problems encountered in the prior arts and have found a process for preparing excellent electroconductive polymeric materials.

An object of the present invention is to provide a process for preparing a five-membered heterocyclic electroconductive polymer film having excellent electrochemical reversibility, electric conductivity and mechanical properties.

DETAILED DESCRIPTION OF THE INVENTION

Figure 1:
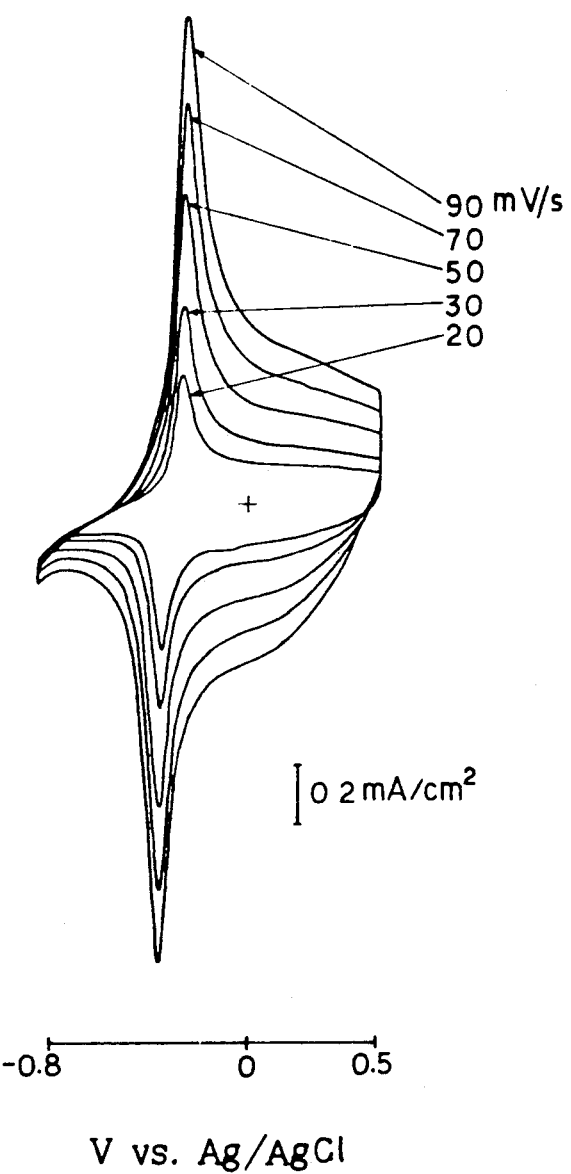
FIG. 1 is a cyclovoltammogram illustrating electrochemical reversibility of polypyrrole.

Electrolytically oxidative polymerization according to the present invention is carried out by polymerizing five-membered heterocyclic monomers in a conventional electrolytic cell in the presence of tetrabutylammonium alkylsulfate (TBAAS) as an electrolyte and a nonaqueous solvent such as acetonitrile or propylene carbonate. TBAAS as an electrolyte includes, for example, tetrabutylammonium dodecyl sulfate (TBADS), a series of TBAAS, which can be prepared by reacting dodecyl sulfate with butyl ammonium halide in an aqueous solution in accordance with Korean Patent Application No. 18,889/89 (filed on Dec 19, 1989).

Polymerization is conducted under a constant electric current between either a pair of platinum electrodes, or glass electrodes coated with metallic oxide (NESA glass) controlling the potential between the electrodes with a reference electrode. Generally, polymerization can be carried out at a wide range of temperatures, preferably at −10° C. to +25° C., and electric current used is 0.5 mA/cm$^2$ to 5 mA/cm$^2$, preferably 2 mA/cm$^2$ to obtain a film. Thickness of a film is proportional to electric charge (Coulomb) applied and it is, therefore, controllable depending upon polymerization time ranging from several seconds to three hours It requires approximately two hours to produce a film of approximately 80 μ thick. The polymerized film is thoroughly washed with a solvent to remove electrolyte on the surface of a film formed on the electrode and then dried in air or in vacuo.

Electrochemical reversibility and stability of a five-membered heterocyclic electroconductive polymer are measured by a cyclic voltammetry technique using a potentiostat. A thin electroconductive polymer film for the property tests is formed on a platinum electrode by applying electric charge ranging 0.05 C/cm$^2$ to 1.0 C/cm$^2$ under a constant electric current, i.e. 5 mA/cm$^2$. The polymer deposited on the platinum electrode is thoroughly washed with a solvent and reduced at −0 8V against the reference electrode for 10 seconds to 10 minutes in a conventional electrolytic cell of a three-electrode system containing 0 036 to 1.0 mole/l of a supporting electrolyte. Thereafter, the electric voltage is increased to +1.2V in accordance with a time schedule and then is decreased to −0.8V to observe the changes of electric current. The scanning rate used is 10 mV/sec to 500 mV/sec, preferably 20 mV/sec to 90 mV/sec. The reference electrode used is a silver/silver chloride electrode using a saturated potassium chloride or saturated calomel electrode. A luggin capillary is disposed to the electroconductive polymer as a working electrode as close as possible in order to reduce iR drop by resistance (R) of the electrolytic system. In particular, electrochemical stability during charge and discharge is observed by color changes and the extent of oxidation-reduction electric current by changing oxidation-reduction states at a scanning rate of 50 mV/sec within the ranges specified as described previously. Electric conductivity is measured under a constant electric current by a four-point method and is calculated by the thickness of the film.

Physical properties of the film are measured by a tensile-strength testing equipment (Universal Testing Machine Company) and length and width of a specimen used are 30 mm and 3 mm, respectively. The cross-head speed is set at 5 mm /min in accordance with ASTM D-638 and arithmetic mean for more than five measurements per specimen is used to reduce the measurement errors.

As shown in the Table, production of electroconductive polymers of elongation (above 5%) and electric conductivity (above 100 S/cm) is characterized in accordance with the present invention. In addition, test results of electroconductive polymers manufactured in the presence of distilled water and the known electrolyte such as sodium dodecyl sulfate, tetraethyl ammonium perchlorate and p-toluenesulfonate were compared with those of the present invention to demonstrate the superiority of the present invention.

The present invention will be illustrated by the following examples The examples are illustrative only and are not intended to limit the scope of the invention in any way.

EXAMPLE 1

Experiments were carried out in a one-compartment electrolytic cell (40 cc) in which the distance between parallel disposed platinum electrodes (each $3\times6\times0.5$ cm) was maintained 1.5 cm.

Electrolyte TBADS was dissolved in 40 cc of pure acetonitrile free from water to give 0.36 mole/l and pyrrole was distilled off in vacuo using calcium hydride (CaH$_2$) at 22° C. to 25° C. Amount of pyrrole used was 0.036 mole/l.

Polymerization was carried out at 20°±2° C. with 14.4 C/cm$^2$ of electric charge applied under a constant electric current (2 mA/cm$^2$) for two hours. Polypyrrole formed on the anode was peeled off, washed with acetonitrile for two hours and then dried prior to use. Electric conductivity of the film thus polymerized was 195 S/cm and elongation and tensile strength were 13.2% and 5.14 kg/mm$^2$, respectively.

As indicated in the Table, films of the present invention presented five to ten-fold increase in the results when compared with those produced from small anion as a dopant in Comparative Examples 2 and 3. (see Table)

TABLE

Five-Membered Heterocyclic Electroconductive Polymer Produced by Electrolyte

| Polymer and Electrolyte | Solvent | Tensile Strength (kg/mm$^2$) | Elongation (%) | Electric Conductivity (S/cm) |
|---|---|---|---|---|
| Examples | | | | |
| 1  PPY-TBADS | Acetonitrile | 5.14 | 13.2 | 195 |
| 2  PTH-TBADS | Acetonitrile | 3.57 | 7.5 | 110 |
| 3  POTH-TBADS | Acetonitrile | 3.57 | 7.5 | $2\times10^{-2}$ (I 2 doped) |
| Comparative Examples | | | | |
| 1  PPY-NaDS | H$_2$O | 1.67 | 4.8 | 95 |
| 2  PPY-TAP | H$_2$O | 1.93 | 1.6 | 75 |
| 3  PPY-TS | H$_2$O | 0.81 | 0.99 | 39 |

(Note)
PPY: polypyrrole
PTH: polythiophene
POTH: polyoctylthiophene
NaDS: sodium dodecyl sulfate
TAP: tetraethyl ammonium perchlorate
TS: p-toluene sulfonate

EXAMPLE 2

All the experimental conditions were the same as in Example 1 except that thiophene was used as a monomer.

EXAMPLE 3

All the experimental conditions were the same as in Example 1 except that 3-octylthiophene was used as a monomer.

EXAMPLE 4

A thin film was formed on 1.0 cm$^2$ of platinum surface under 5 mA/cm$^2$ of electric current with 0.05 C/cm$^2$ to 0.5 C/cm$^2$ of electric charge applied using the same conditions and the electrolytic cell as described in Example 1.

Electrochemical characteristics of the film obtained were determined in acetonitrile or an aqueous solution containing 1.0 mole/l of TBADS as an electrolyte in the same electrolytic cell used for polymerization by a three-electrode system having a reference electrode.

Thus, a potentiometer was used to undergo reduction at $-0.8$V against the reference electrode for 10 seconds followed by increasing to 0.5V and once again decreasing to $-0.8$V. Scanning rate was 20 mV/sec to 90 mV/sec.

Electrochemical properties of the film, formed with 0.05 C/cm$^2$ various scanning rate of 20, 30, 50, 70 and 90 mV/sec are shown in FIG. 1.

EXAMPLE 5

Charge-discharge test up to 3,400 times was done on the film at 50 mV/sec of scanning rate with 0.05 C/cm$^2$ of electric charge using conditions and the electrolytic cell as described in Example 4.

Figure 2:
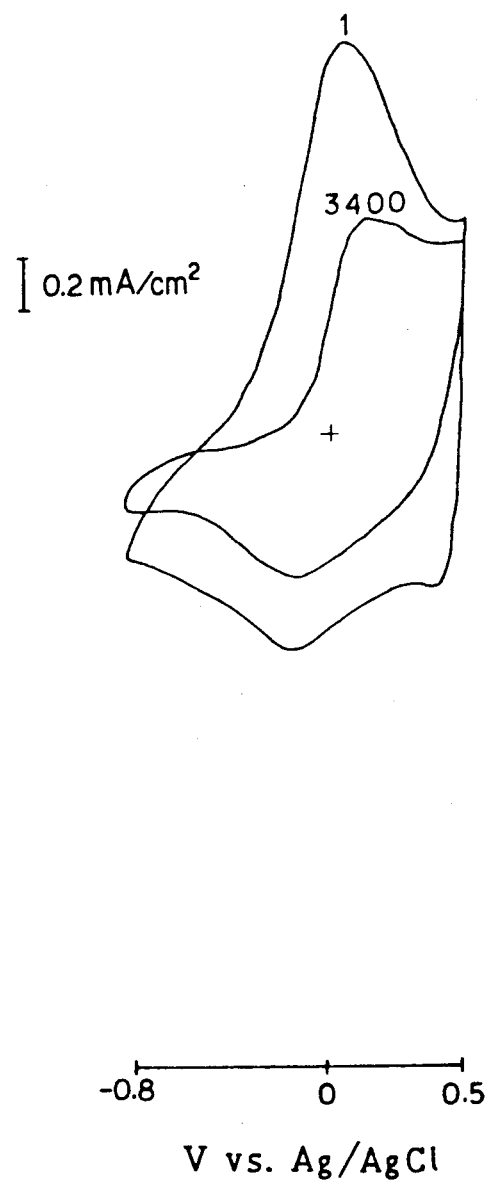
FIG. 2 is a cyclovoltammogram illustrating electrochemical stability of polypyrrole.

Changes of electric current depending on charge-discharge frequencies were given in FIG. 2. The oxidation-reduction electric current peak shown after 3,400 times was not considerably changed compared with that of the first scanning, and electrochroism was apparently observed.

COMPARATIVE EXAMPLES 1 TO 3

All the experimental conditions were the same as described in Example 1 except that distilled water was used instead of acetonitrile and various electrolytes shown in the Table were used.

We claim:

1. A process for preparing a five-membered heterocyclic electroconductive polymeric film of the formula (II) of which electric conductivity is 100 S/cm or more, which comprises electrically polymerizing five-membered heterocyclic monomers of the formula (I) in the presence of tetrabutyl ammonium alkyl sulfate as an electrolyte and an organic solvent, no water being used during processing, wherein formulas (I) and (II) are

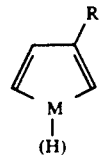

(I)

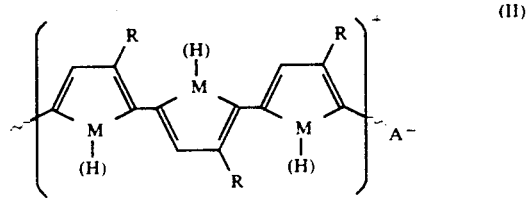

(II)

and wherein M represents nitrogen or sulfur, provided that hydrogen is deleted when M is sulfur, R represents hydrogen or C$_{4-22}$ aliphatic alkyl group, provided that R is hydrogen when M is nitrogen, and R represents hydrogen or C$_{4-22}$ aliphatic alkyl group when M is sulfur, and A represents an anion.

2. A process according to claim 1 wherein a five-membered heterocyclic monomer is selected from the group consisting of pyrrole, thiophene and thiophene derivatives with C$_4$–C$_{22}$ aliphatic group substituted on the 3-position of thiophene.

3. A process according to claim 1 wherein a five-membered electroconductive heterocyclic polymer is selected from the group consisting of polythiophene with C$_4$–C$_{22}$ aliphatic group substituted on the 3-position of thiophene, polypyrrole and polythiophene.

4. A process according to claim 1 wherein an organic solvent is selected from the group consisting of acetonitrile and propylene carbonate.

5. A process according to claim 1 wherein tetrabutyl ammonium alkyl sulfate as an electrolyte is tetrabutyl ammonium dodecyl sulfate.

* * * * *

UNITED STATES PATENT AND TRADEMARK OFFICE
CERTIFICATE OF CORRECTION

PATENT NO. : 5,120,407
DATED      : June 9, 1992
INVENTOR(S): Kim et al.

It is certified that error appears in the above-identified patent and that said Letters Patent is hereby corrected as shown below:

Column 2, line 18, delete "up" and substitute therefor -- (up --;

Column 3, lines 22-23, delete "-0 8V" and substitute therefor -- -0.8V --;

Column 3, line 25, delete "0 036" and substitute therefor -- 0.036 --;

Column 4, line 17, after "examples" insert -- . --;

Column 5, line 29, after "0.05 C/cm$^2$" insert -- of electric charge, at --.

Signed and Sealed this

Twenty-first Day of September, 1993

*Attest:*

BRUCE LEHMAN

*Attesting Officer*   *Commissioner of Patents and Trademarks*